United States Patent [19]

Wong et al.

[11] Patent Number: 4,654,479
[45] Date of Patent: Mar. 31, 1987

[54] DOT MATRIX METHOD OF ENTERING AND TRANSMITTING SCRIPT

[76] Inventors: Leo K. Wong; Philip S. Wong, both of 30 Perthshire Street, Scarborough, Ontario M1V 3A9, Canada

[21] Appl. No.: 724,718

[22] Filed: Apr. 18, 1985

[51] Int. Cl.$^4$ .................. G08C 21/00; G06K 9/18
[52] U.S. Cl. ..................................... 178/18; 382/11
[58] Field of Search ............... 178/18, 19, 20, 2 R, 178/36, 3, 4, 17, 26 R; 400/124, 484; 382/51, 52, 3, 9, 10, 11, 13

[56] References Cited

U.S. PATENT DOCUMENTS

| | | | |
|---|---|---|---|
| 2,534,330 | 12/1950 | Wong | 197/1 |
| 3,128,458 | 4/1964 | Romero | 178/18 |
| 3,909,785 | 9/1975 | Howells | 382/13 |
| 4,070,544 | 1/1978 | Lambden | 178/18 |
| 4,132,976 | 1/1979 | Siegal | 382/11 X |
| 4,262,281 | 4/1981 | Buckle et al. | 340/146.3 SY |
| 4,318,096 | 3/1982 | Thornburg et al. | 340/706 |
| 4,440,513 | 4/1984 | Kataoka | 400/165.1 |

OTHER PUBLICATIONS

The New York Times, "I.B.M. System for Chinese", Sep. 13, 1984.
The Washington Post, "A Cheap Way to Create Spiffy Dot Matrix Copy", Aug. 27, 1984.
The New York Times, "Different Strokes, Computerized", Jun. 20, 1984.

Primary Examiner—Stafford D. Schreyer
Attorney, Agent, or Firm—David H. Semmes; Warren E. Olsen

[57] ABSTRACT

Dot matrix method of entering and transmitting script. For example, Chinese script in the form of a character or ideograph is written upon a dot matrix "keyboard", then registered and stored within a conventional computer memory. As desired, the computer may print the individual Chinese character or a plurality of Chinese characters, constituting the entire memory, upon a dot matrix printer.

The present method is characterized by its capability of registering the entered script or character as digital information within a latch matrix, then transferring the digital information from the latch matrix as groups of bytes into an input/output control. The accepted digital information may be transmitted from input/output control to random access memory, read only memory, a microprocessor controller or external communications.

10 Claims, 12 Drawing Figures

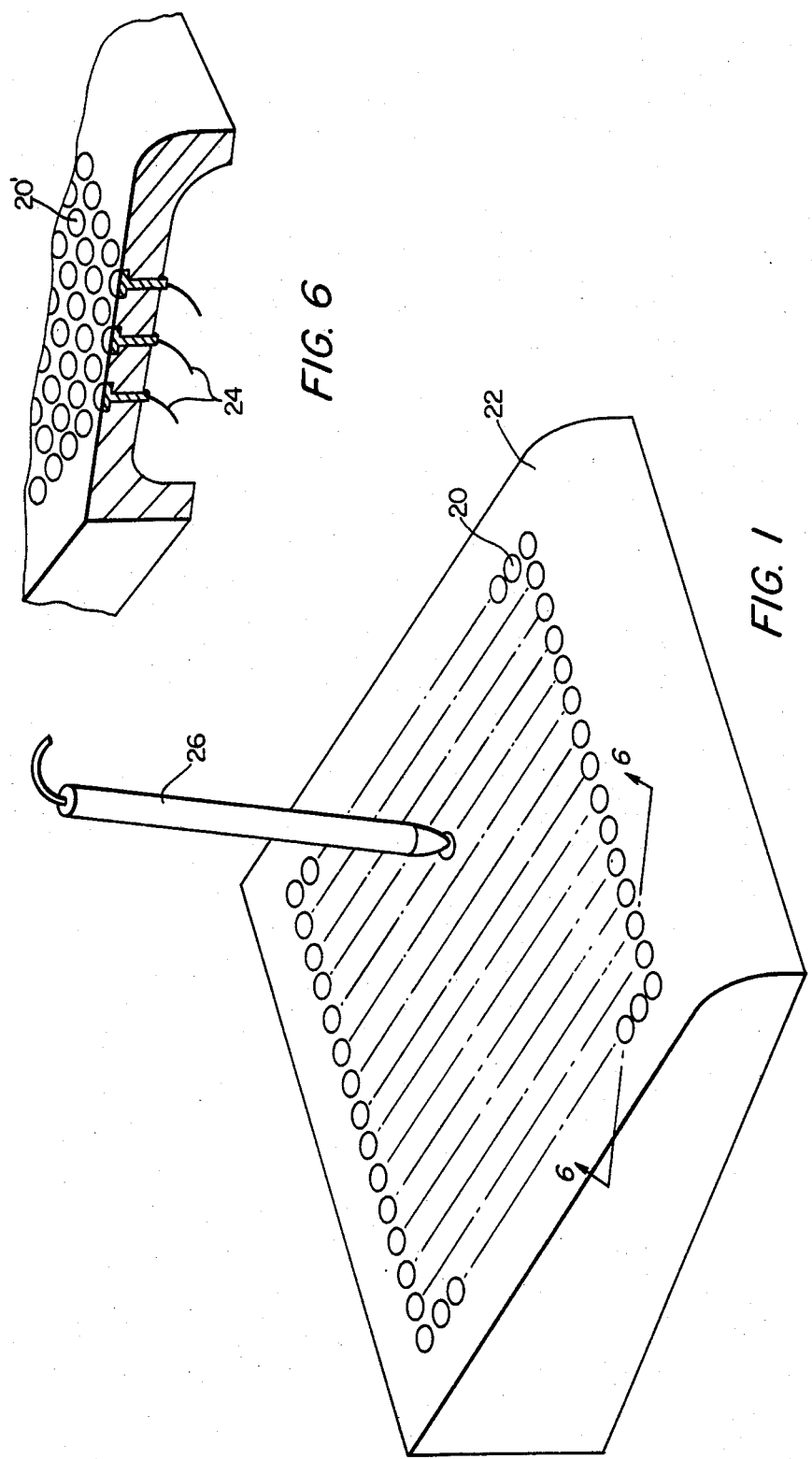

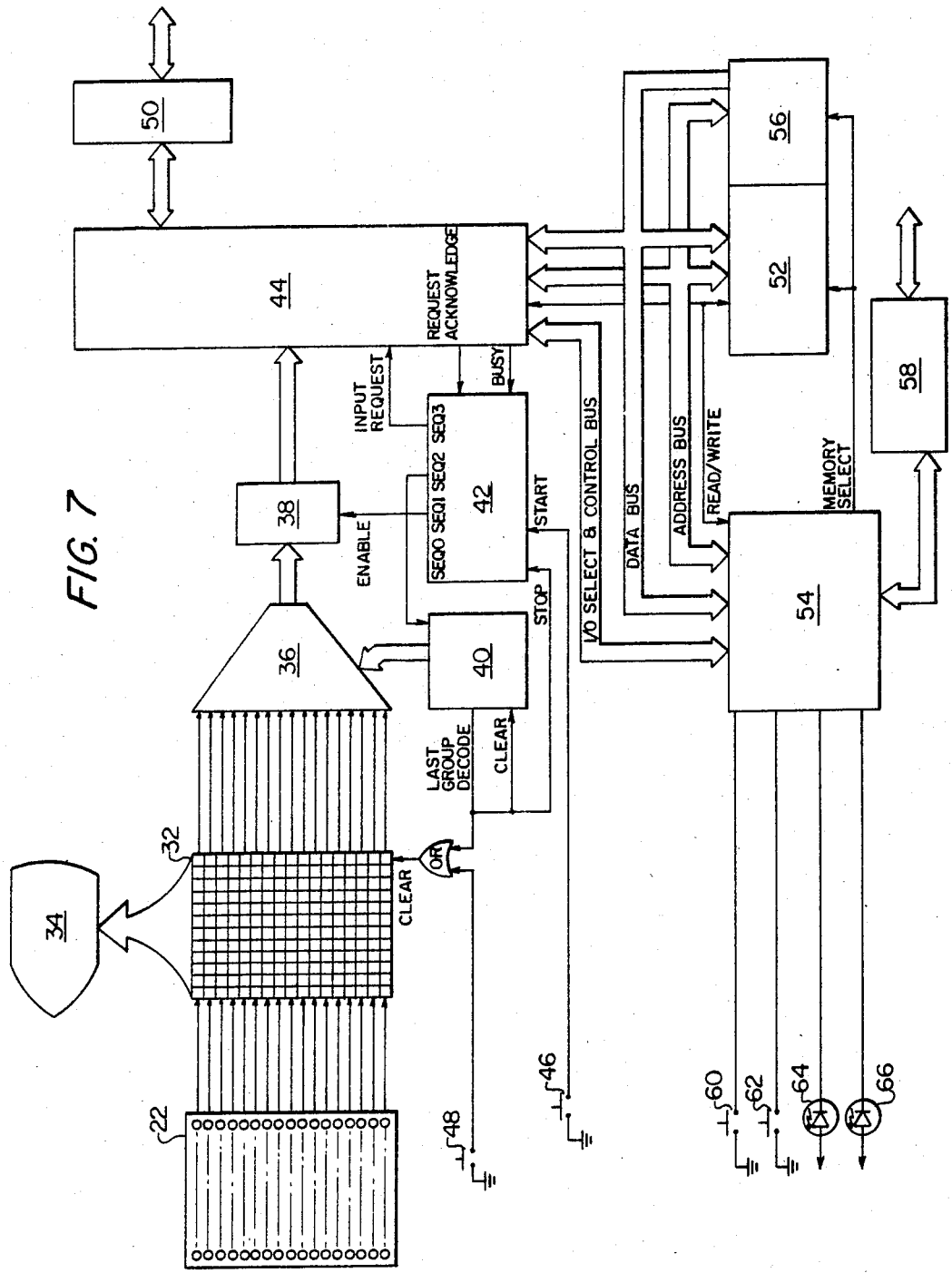

DOT MATRIX METHOD OF ENTERING AND TRANSMITTING SCRIPT

BACKGROUND OF THE INVENTION

1. Field of the Invention

Printing and storing script, particularly, a method for entering Chinese character images within a set matrix, registering the entered character as digital information which may be stored within a random access memory. The method may be programmed for direct entry to other computer systems, output to printers or video display units and the like.

2. Description of the Prior Art

WONG: U.S. Pat. No. 2,534,330
LAMBDEN: U.S. Pat. No. 4,070,544
BUCKLE et al.: U.S. Pat. No. 4,262,281
THORNBURG et al.: U.S. Pat. No. 4,318,096
KATAOKA et al.: U.S. Pat. No. 4,440,513

*The New York Times*, Thursday, Sept. 18, 1984, "IBM System for Chinese";
*The Washington Post*, Aug. 27, 1984, "A Cheap Way to Create Spiffy Dot Matrix Copy";
*The New York Times*, June 20, 1984, "Different Strokes, Computerized".

These references are discussed in an accompanying INFORMATION DISCLOSURE STATEMENT.

SUMMARY OF THE INVENTION

According to the present invention, script such as Chinese characters may be entered upon a dot matrix of individual conductive contacts, each contact having an individual latch circuit. The entered characters are registered as digital information within a latch matrix composed of the individual latch circuits. Then, the digital information is transferred from the latch matrix as groups of bytes into an input/output control. The accepted digital information may then be transmitted from input/output control to a random access memory, an input/output transceiver or a microprocessor control with access to an external communication line.

DESCRIPTION OF THE DRAWINGS

FIG. 1 is a perspective view of a conductive stylus entering a script character upon a dot matrix of individual conductive contacts.

FIG. 6 is an enlarged, fragmentary perspective, partially in section and taken along section line 6—6 of FIG. 1, showing the individual wires leading from the conductive contacts.

FIG. 7 is a circuit diagram of a suggested system for entering and transmitting script, according to the present invention.

DESCRIPTION OF THE PREFERRED EMBODIMENTS

This is a versatile method for entering character images, such as Chinese ideographs, within a set matrix to form digital information. A principal advantage resides in the ease of use, such that neither special training nor computer education is required.

The system may be programmed for specific application such as direct entry to other computer systems, output to printers or for video display units and other communication needs.

How a Character Image is Created

Figure 3:
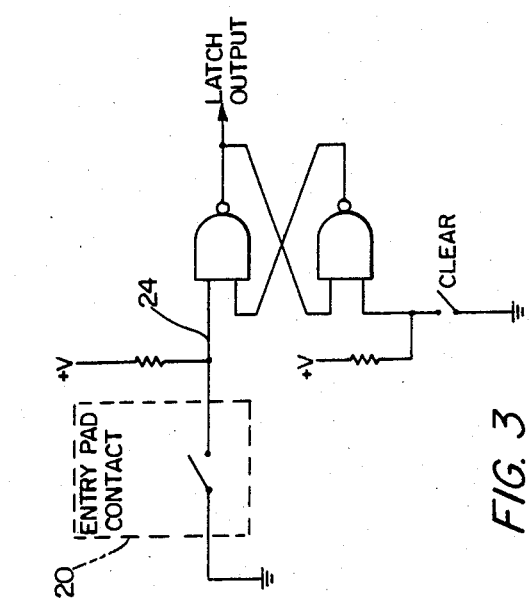
FIG. 3 is a circuit diagram of a typical digital latch circuit for each of the conductive contacts in the dot matrix.

In FIG. 1, entry pad 22 is illustrated as comprising a plurality of conductive contacts 20, arranged within a square matrix. Each contact 20 is connected to an electronic latch circuit via electric wire 24, as illustrated in FIGS. 3 and 6. The size of the matrix latch, comprised of the individual latch circuits, may be varied, depending upon the density of the resolution required. A suggested reasonable size for Chinese character images is a matrix of 15 dots [width] × 17 dots [height]. Initially, all the latch circuits within the matrix are cleared to a predetermined state (namely "Logical 'H' level").

Figure 2:
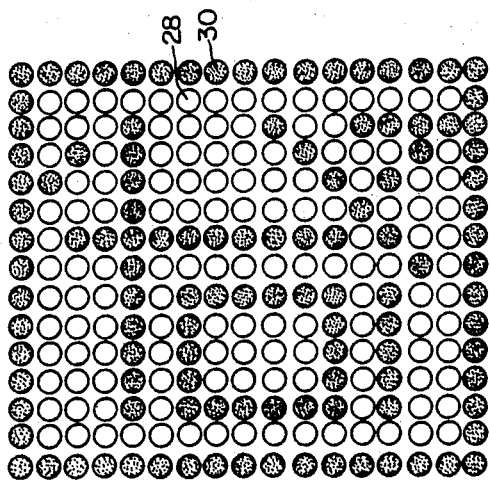
FIG. 2 is a schematic view of the Chinese character "kuo" (translated as "kingdom" or "country"), entered within the dot matrix.

To create a certain Chinese character image, a conductive stylus 26 which carries a 'ground' voltage level may be used to write upon entry pad 22. When the appropriate contact 20 is touched by stylus 26, the corresponding latch circuit, as illustrated in FIG. 3, will be set to a "Logical 'L' level". Thus, as illustrated in FIG. 2, the Chinese character image is defined in the latch matrix, i.e., "Logical 'H' level" bits represents blanks 28 and "Logical 'L' level" bits represents strokes 30 of the character image. In FIG. 2, the character image for the entered Chinese character "kuo" (translated as "kingdom" or "country"), may be seen through a video display unit. If there has been a mistake, the character image may be erased by clearing the latch matrix to all "Logical 'H'"s" by depressing erase key 48, as illustrated in FIG. 7. Alternative ways of setting the latches other than using a conductive stylus include: (A) applying pressure upon a conductive mat consisting of contact studs, as illustrated in FIGS. 4 and 5, or, (B) by using touch-sensitive capacitance contacts, not illustrated.

Figure 5:
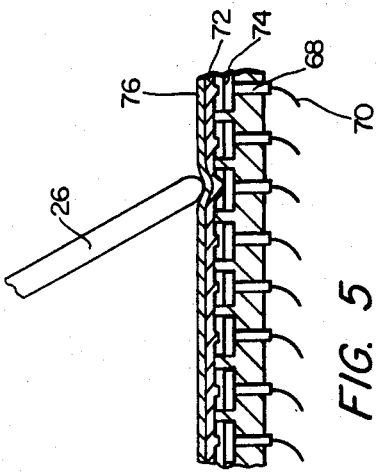
FIG. 5 is a fragmentary vertical section of the alternative construction illustrated in FIG. 4.
Figure 4:
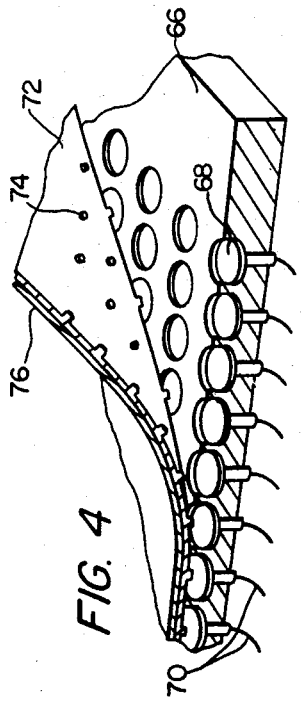
FIG. 4 is a fragmentary exploded view, partially in section, of an alternative construction of the dot matrix pad, involving a protective layer, a conductive sheet and movable conductive contacts.

In FIGS. 4 and 5, an alternative construction of matrix entry pad 22 is illustrated. An insulation block 66 supports conductive contacts 68 with electrical wires 70 extending through the bottom of block 66. A conductive sheet 72 overlays block 66 with individual contact studs 74 in alignment with the respective contacts 68. A protective layer 76 may be supported upon conductive sheet 72.

System Functional Description

As illustrated in FIG. 7, the Chinese character is created upon entry pad 22 and registered within the latch matrix 32 as digital information. The image formed may be seen in video display 34, FIGS. 2 and 7. The function of data multiplexer 36 is to multiplex the digital data registered within latch matrix 32 into groups of 8 bit bytes for transferring, since the matrix data is too large to be transferred at once. In the present model, 8 bit bytes are employed, although variations may be employed also. Data latch 38 transmits output from data multiplexer 36.

The data group select counter 40 is used to keep track of which group of data is to be transferred at a given one time, so that data will be transferred in a set sequence.

The sequence counter and control 42 provides timing and control signals to transfer data from latch matrix 32 to input/output ports and control 44.

Operation is as follows:

Sequence 0: This is the initial idle state. When a character image is formed within latch matrix 32, the 'enter key' 46 should be depressed which sends a 'start' signal to the sequence control 42 and starts the sequence counter which will step to sequence 1.

Sequence 1: This is to enable the group of data at the output of data multiplexer 36 to be latched into data latch 38.

Sequence 2: This to step the group select counter 40 by one, so that the next group of data is selected at the output of data multiplexer 36.

Sequence 3: An 'input request' signal is sent to input-/output (I/O) control 44 to signal that data is available at data latch 38 and ready to be accepted by the input/output control 44.

After I/O ports and control 44 has accepted the byte of data presented at data latch 38, a 'request knowledge' signal is sent back to sequence counter and control 42 which will step to Sequence 1 again. The operation will be repeated, while data group select counter 40 is being updated every time to sequentially select a group of data for transferring.

When the last group of data within latch matrix 32 is transferred, as indicated by a certain count value in group select counter 40, latch matrix 32 and both data group select counter 40 and sequence counter and control 42 will be cleared back to initial state and wait until enter key 46 is depressed, indicating that another character image is to be entered.

Input/output ports and control 44 directs the data accepted from data latch 38 to be transferred either directly to another device via input/output (I/O) transceiver 50 or to the random access memory (RAM) 52.

Data can be accepted, also, from other devices through I/O transceiver 50 and transmitted to RAM 52, or vice versa, thus providing a versatile data flow for the system.

The operation of I/O ports and control 44 is totally controlled by microprocessor control 54 through an I/O select and control bus.

Microprocessor controller 54 consists of a central processing unit and is fully programmable. Programs for different operations can be hard written in programmable read-only-memory 56 chips and incorporated within the system by mounting upon sockets. Thus, programs may be changed easily by changing the ROM chips.

A programmable communication interface 58 is provided, also, in the system for serial data communication through external communication lines and is fully programmable by microprocessor controller 54 to operate using virtually any serial data transmission technique presently in use on the market.

As illustrated in FIG. 7, there are, also, microprocessor control special function keys 60, 62, and light indicators 64, 6, which may be program-controlled.

Figure 8A:
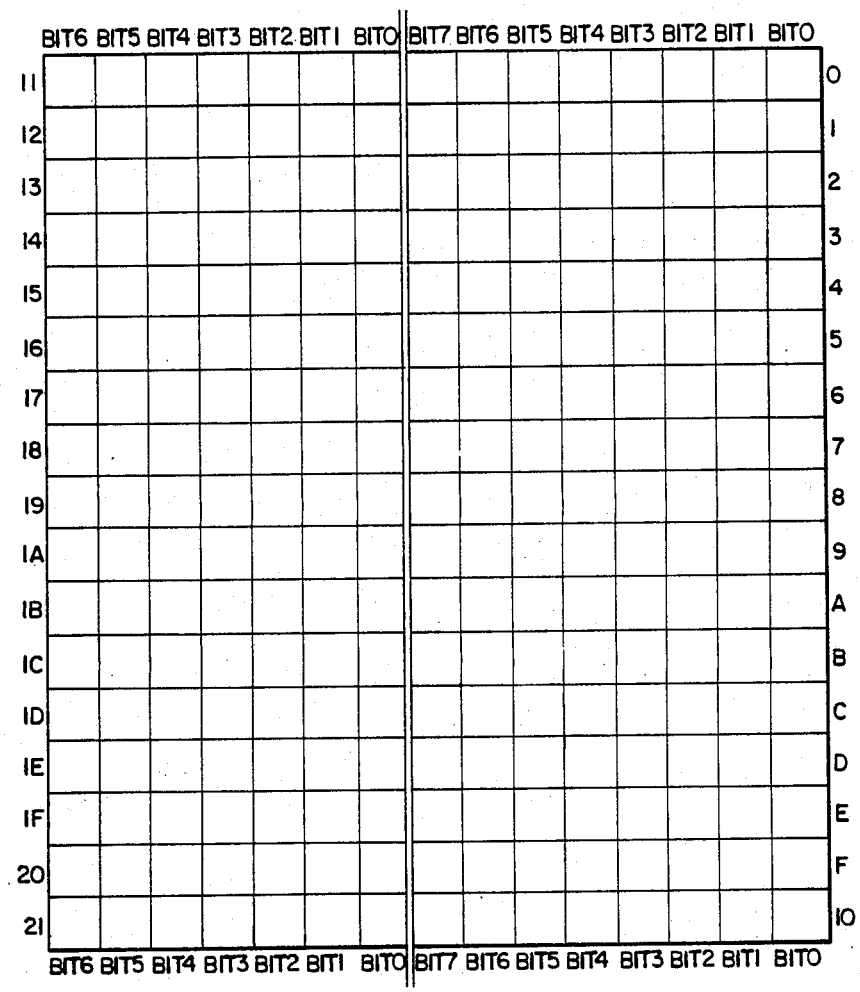
FIG. 8(A) is a diagram of the character latch matrix 34, each square representing one latch circuit, as shown in FIG. 8.
Figure 8:
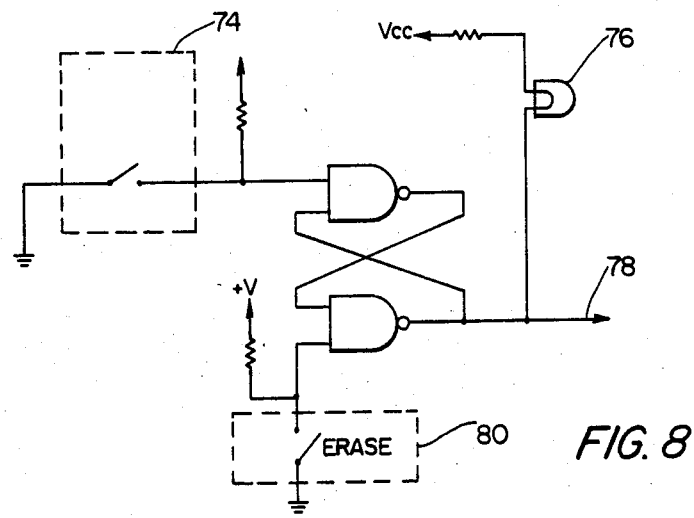
FIG. 8 is a circuit diagram of the individual latch circuit for the latch matrix squares.

FIG. 8(A) graphically illustrates character latch matrix 32, each square representing one latch circuit as shown in FIG. 8. When the appropriate contact 74 on the input pad is activated, the corresponding latch will be set and the display light-emitting diode 76 is lighted, to create a visual display such as is illustrated in FIG. 2.

Since this is an 8-bit data path circuitry, the whole matrix cannot be transferred to I/O ports and control 44 at one time, as illustrated in FIG. 7. Therefore, as illustrated in FIG. 8(A), the matrix is divided into two halves. The right side of the matrix consists of seventeen 8-bit bytes numbered $0_{HEX}$ to $10_{HEX}$ and the left side consists of seventeen 7-bit bytes numbered $11_{HEX}$ to $21_{HEX}$. To transfer the whole character, the byte 0 will be transferred, first, then byte 1, and so on, until the last byte $21_{HEX}$ is being transferred.

Figure 9:
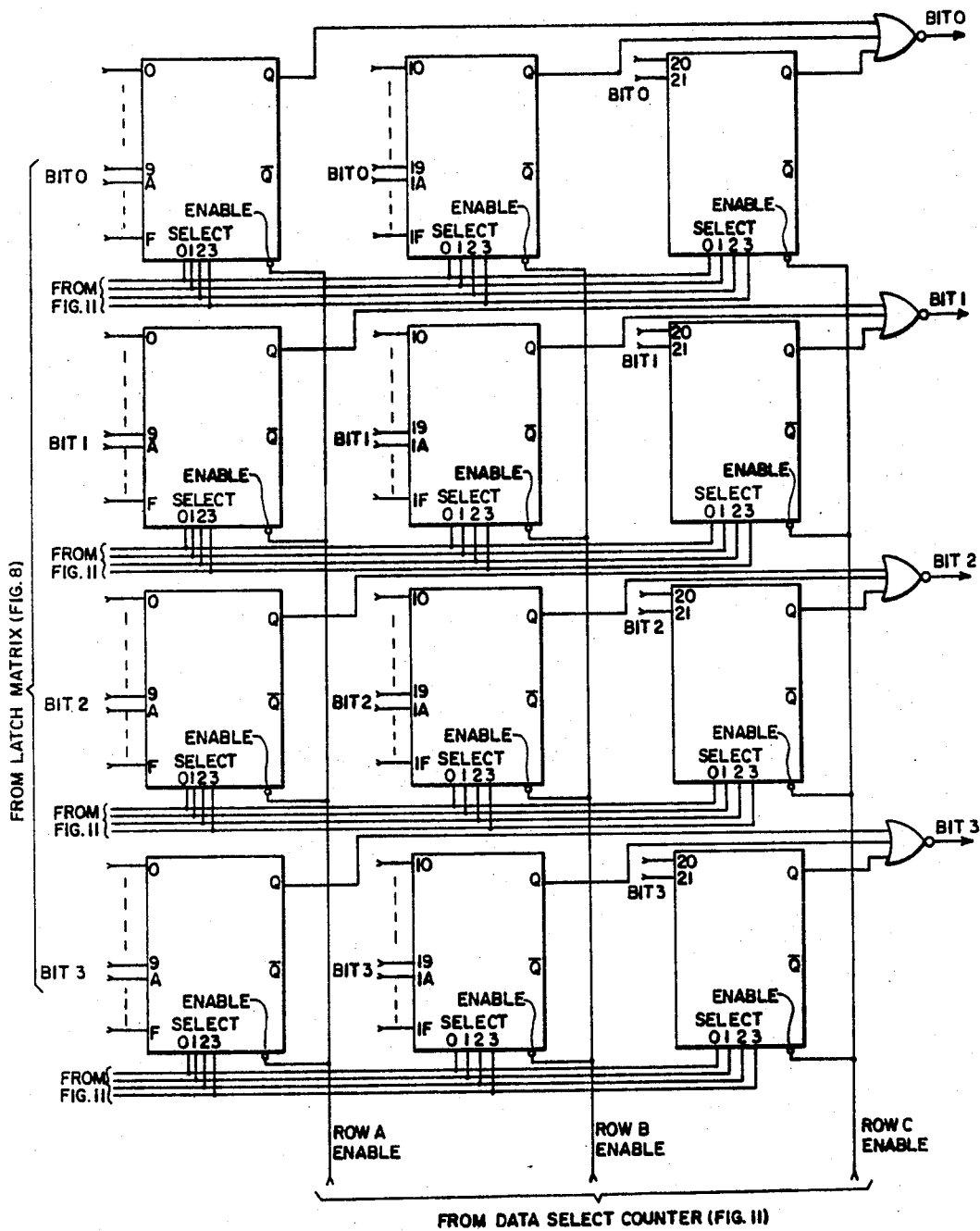
FIG. 9 is a circuit diagram of the data multiplexer 36 as connected to the latch matrix illustrated in FIG. 8A.
Figure 10:
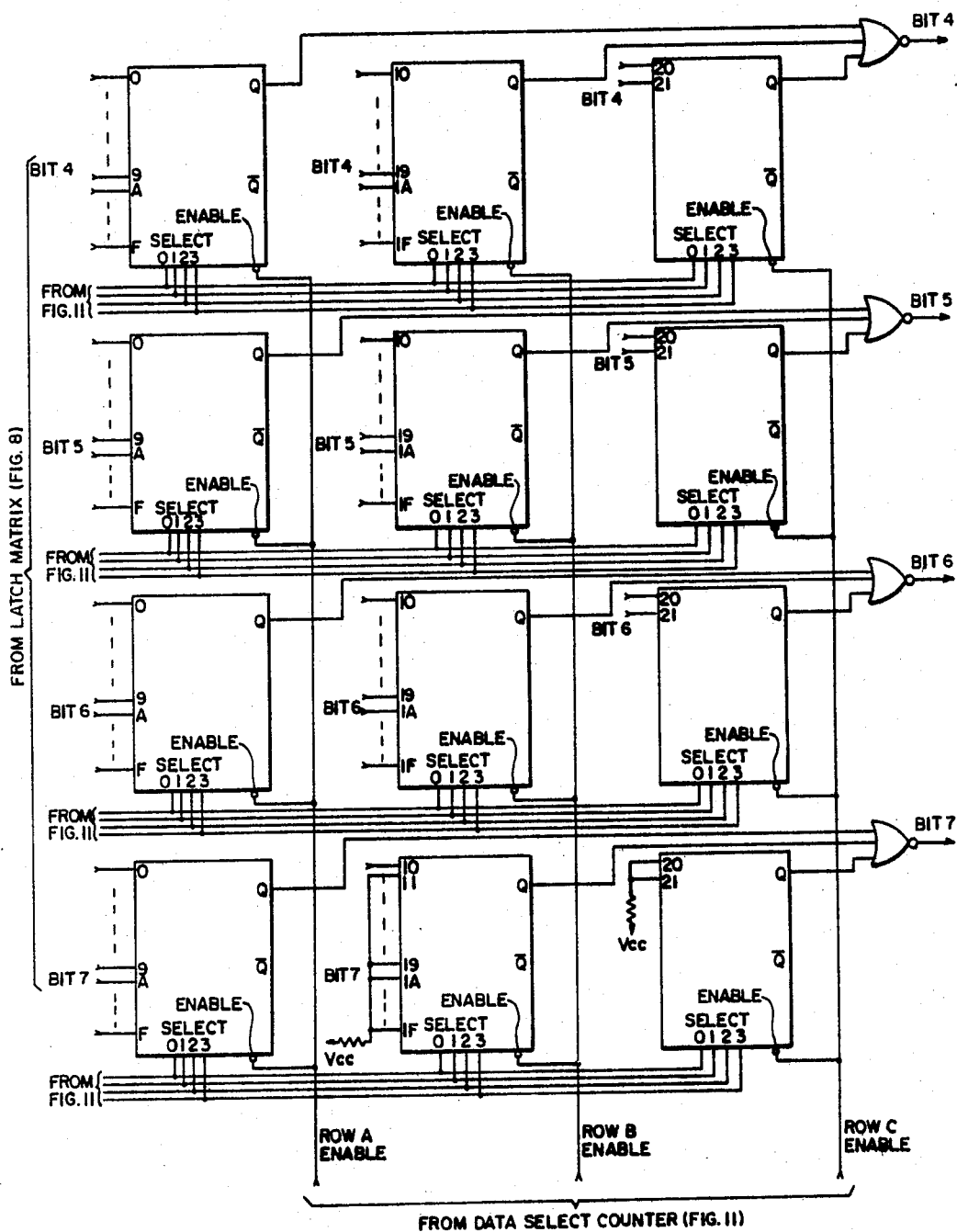
FIG. 10 is a circuit diagram showing the multiplexer 36 selecting bits 4 to 7.
Figure 11:
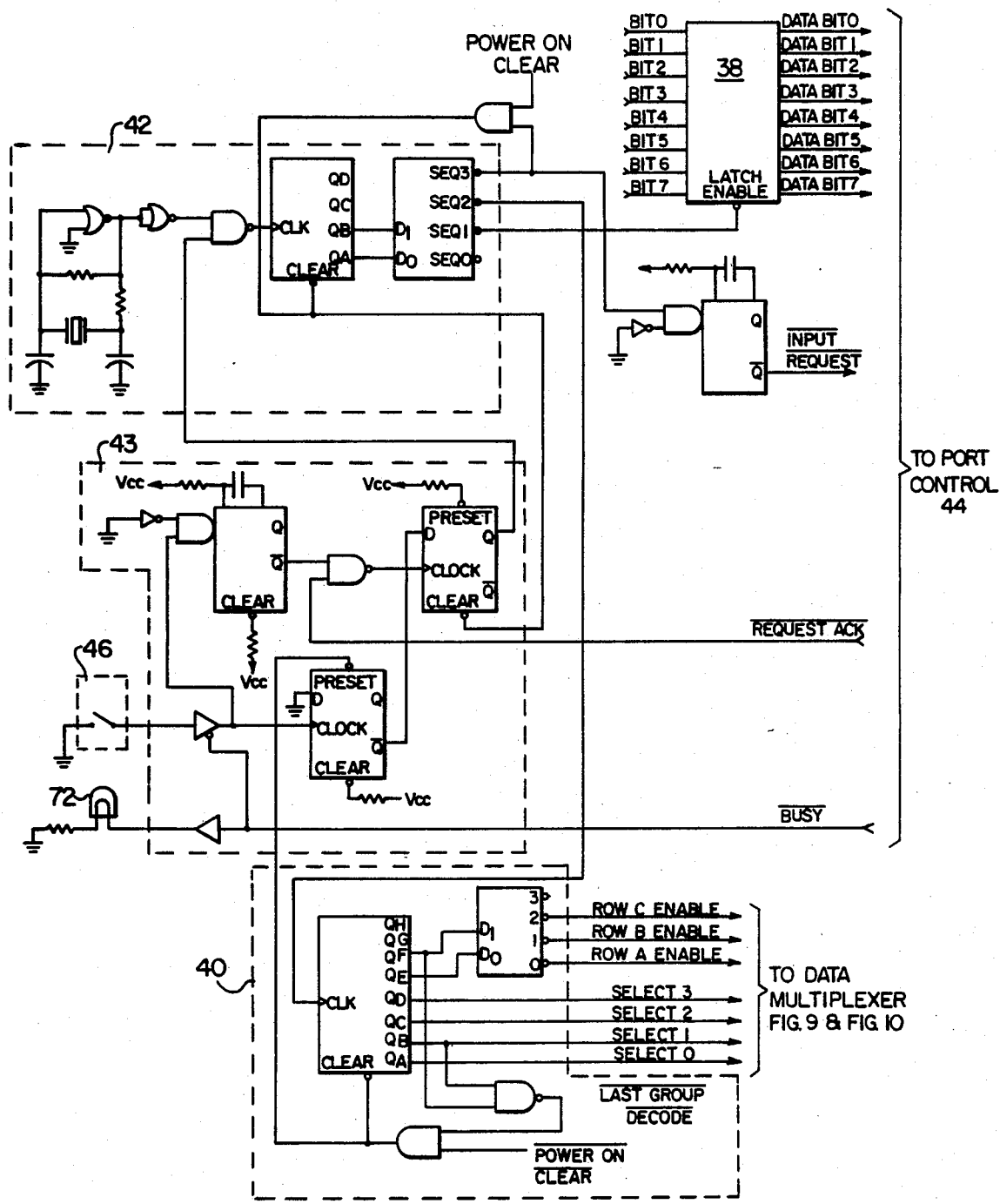
FIG. 11 is an illustration of data group selector 40, sequence counter and control 40 and data latch 38 components, illustrated in FIG. 7.

The output 78 of each latch circuit will be connected to the corresponding input of "16 to 1" data multiplexer 36 as illustrated in FIGS. 7, 9 and 10. In FIGS. 9 and 10, each rectangle represents one "16 to 1" data multiplexer chip. FIG. 9 shows multiplexer 36 selecting bits 0 to 3 and FIG. 10 shows multiplexer 36 selecting bits 4 to 7. When the appropriate row of multiplexer 36 is enabled, the state of the selected input bit of that row of the multiplexer will be sent over to data latch 38, as illustrated in FIG. 11. The binary value of the select lines 0, 1, 2 and 3 determines which one of the sixteen input bits is being selected.

As illustrated in FIG. 11, the row enable and select lines are controlled by the output of data select counter 40. FIG. 11 illustrates, also, the detailed circuitry of sequence counter 42, input control 43, as well as data select counter 40.

As illustrated in FIG. 7, depressing "enter" key 46 will start sequence counter 42 and initiate transferring the content of latch matrix 32 to I/O ports and control 44. Indicators 64, 66, may provide visual indication that microprocessor controller 54 is busy. A "Busy" signal from I/O ports and control 44 will be visually displayed at signal light 72 and will inhibit Entry key 46 from initiating sequence counter 42.

We claim:

1. Dot matrix method of entering and transmitting script comprising:
   a. entering the script character upon a dot matrix of individual conductive contacts, each contact having an individual latch circuit;
   b. registering the entered character as digital information within a latch matrix comprised of the individual latch circuits;
   c. transferring said digital information from the latch matrix as groups of bytes into an input/output control; and
   d. transmitting the accepted digital information from input/output control to random access memory.

2. Dot matrix method of entering and transmitting script comprising:

a. entering a script character upon a dot matrix of individual conductive contacts, each contact having an individual latch circuit;

b. registering the entered character as digital information within a latch matrix comprised of the individual latch circuits;

c. transferring the digital information from the latch matrix as groups of bytes into an input/output control; and d. transmitting the accepted digital information from input/output control to an input/output transceiver.

3. Dot matrix method of entering and transmitting script comprising:

a. entering a script character upon a dot matrix of individual conductive contacts, each contact having an individual latch circuit;

b. registering the entered character as digital information within a latch matrix comprised of the individual latch circuits;

c. transferring the digital information from the latch matrix as groups of bytes into an input/output control; and d. transmitting the accepted digital information from input/output control to a microprocessor controller.

4. Dot matrix method of entering and transmitting script as in claim 1, including:

multiplexing digital information within the latch matrix into groups of eight bit bytes prior to said transferring.

5. Dot matrix method of entering and transmitting script as in claim 4, including:

select counting of digital information being transferred from the latch matrix, so as to transfer said data within a set sequence from said latch matrix to said input/output control.

6. Dot matrix method of entering and transmitting script comprising:

a. entering a script character upon a dot matrix of individual conductive contacts, each contact having an individual latch circuit;

b. registering the entered character as digital information within a latch matrix comprised of the individual latch circuits;

c. multiplexing digital information within the latch matrix into groups of eight bit bytes;

d. transferring the digital information from the latch matrix as groups of bytes into an input/output control;

e. select counting of digital information being transferred from the latch matrix, so as to transfer said data within a set sequence from the latch matrix to the input/output control;

f. accepting external digital information into the input/output control via a transceiver; and g. transmitting the accepted digital information from the input/output control to a microprocessor controller.

7. Dot matrix method of entering and transmitting script as in claim 6, including:

transmitting digital information from random access memory through input/output control and said input/output transceiver to an external system.

8. Dot matrix method of entering and transmitting script as in claim 3, including:

directing input/output control through a programmable microprocessor controller having a read only memory chip guidance.

9. Dot matrix method of entering and transmitting script as in claim 8, including:

modifying said microprocessor controller via an external programmable communication interface.

10. Dot matrix method of entering and transmitting script as in claim 1, including visually displaying the character registered within the latch matrix.

* * * * *